US008201987B2

(12) United States Patent
Carroll (10) Patent No.: US 8,201,987 B2
(45) Date of Patent: Jun. 19, 2012

(54) BATTER SHAKING APPARATUS (76) Inventor: Stephen Carroll, Jacksonville, FL (US)

( * ) Notice: Subject to any disclaimer, the term of this patent is extended or adjusted under 35 U.S.C. 154(b) by 177 days.

(21) Appl. No.: 12/717,949

(22) Filed: Mar. 4, 2010

(65) Prior Publication Data
US 2010/0227038 A1 Sep. 9, 2010

Related U.S. Application Data (60) Provisional application No. 61/209,535, filed on Mar. 9, 2009.

(51) Int. Cl.
*B01F 11/00* (2006.01)
(52) U.S. Cl. .................... 366/111; 366/208; 426/519
(58) Field of Classification Search .......... 366/208–216, 366/219, 110–114; 426/51
See application file for complete search history.

(56) References Cited

U.S. PATENT DOCUMENTS

| | | | | | |
|---|---|---|---|---|---|
| 1,908,104 | A | * | 5/1933 | Bell | 74/26 |
| 2,255,799 | A | * | 9/1941 | Meinzer | 366/111 |
| 2,970,235 | A | * | 1/1961 | Pike | 310/83 |
| 3,814,387 | A | * | 6/1974 | Ahrens et al. | 366/160.1 |
| 4,061,315 | A | * | 12/1977 | Eitzen et al. | 366/111 |
| 5,499,872 | A | * | 3/1996 | Baxter | 366/213 |
| 2010/0227038 | A1 | * | 9/2010 | Carroll, Jr. | 426/519 |

* cited by examiner

*Primary Examiner* — Charles E Cooley
(74) *Attorney, Agent, or Firm* — Mark Young, PA (57) ABSTRACT A kitchen shaking apparatus includes a housing, a controllable oscillating actuator contained in the housing, a platform mechanically coupled to the controllable oscillating actuator, and a plurality of adjustable coacting restraining arms operably coupled to the housing. Each of the restraining arms including a vertical segment and a horizontal segment and is positioned and configured to allow the vertical segment to contact an object on the platform. A speed control is configured to control frequency of oscillation of the actuator. A timer control is configured to control duration of operation of the actuator. A locking mechanism releasably locks at least one adjustable restraining arm at a user-selectable position. A removable pad is attached to the top surface of the platform. After shaking mixed ingredients using the apparatus, the ingredients are devoid of substantial air pockets and the consistency is improved for an enhanced processed food product.

12 Claims, 9 Drawing Sheets

BATTER SHAKING APPARATUS

RELATED APPLICATION

This application is a nonprovisional of, and claims the benefit of priority of, U.S. provisional application 61/209,535 filed 9 Mar. 2009, the entire contents of which are incorporated herein by this reference and made a part hereof.

FIELD OF THE INVENTION

This invention relates generally to kitchen appliances, and, more particularly, to a shaker for agitating and consolidating ingredients in a bowl such as batter.

BACKGROUND

Agitators have long been used in chemistry and science labs for the mixing and separating of compounds. Typically, such devices comprise an actuator such as a motor coupled to a platform by a linkage. The linkage transforms rotary motion of the motor into oscillatory motion of the platform. A container holding the contents to be mixed is placed upon the shaker platform. Typically the container is a test tube or sealed jar. Restraining devices secure the container to the platform. Spillage and ease of removal are not primary concerns. Shaking commences and continues until a determined time period has elapsed or a consistency is achieved.

While such agitators are suitable for their intended purpose in laboratories, they are not particularly well suited for kitchen use. Shortcomings include inability to conveniently accommodate, hold and release kitchen containers such as trays, pans, and bowls. Additionally, such agitators do not provide a user interface suitable for kitchen use. Furthermore, such agitators are not designed with easy cleanup in mind. Moreover, they are not food preparation grade, meaning they are not designed with food preparation in mind.

As prior art shakers have been designed with industrial and testing environments in mind, it should come as no surprise that there has been no serious effort to incorporate shakers into home kitchen baking processes. A review of modern cooking equipment websites and catalogues reveals no shakers whatsoever designed for home kitchen use. A review of modern cookbooks reveals no recipes requiring agitation of batters using a shaking apparatus. This is unfortunate because shaking ingredients, such as batters, yields a unique consistency. Agitation releases entrapped gasses, reducing air bubbles, pockets and voids, that would otherwise form in a product. Without agitation prior to baking, entrapped gases frequently cause an otherwise perfectly shaped cake product to collapse when either the cake cools and air pockets contract or an air pocket expands until it bursts through the surface of the cake. Concomitantly, agitation increases density of the cooked product, by eliminating voids. By way of illustration, batter for a light and fluffy cake may be agitated to release entrapped gases, thereby yielding a denser product having the consistency of a cookie or brownie. In fact, to a large extent the density may be regulated based upon the type of food being prepared.

The invention is directed to overcoming one or more of the problems and solving one or more of the needs as set forth above.

SUMMARY OF THE INVENTION

To solve one or more of the problems set forth above, in an exemplary implementation of the invention, a kitchen shaking apparatus includes a housing, a controllable oscillating actuator contained in the housing, a platform mechanically coupled to the controllable oscillating actuator, and a plurality of adjustable restraining arms operably coupled to the housing. Each of the restraining arms including a vertical segment and a horizontal segment and is positioned and configured to allow the vertical segment to contact an object on the platform. The actuator may comprise a motor.

At least one control may be provided to activate the controllable oscillating actuator. Preferably, a speed control is configured to control frequency of oscillation of the actuator. A timer control is configured to control duration of operation of the actuator. The controls are connected to a control module contained within the housing.

The vertical segment of each adjustable restraining arm extends from the horizontal segment to an elevation above the platform. Thus, an object on the platform (that happens to be wider than the platform at least at some points) can be gripped by the arms. In one implementation, the plurality of adjustable restraining arms includes at least three coacting restraining arms. In a preferred implementation, the plurality of adjustable restraining arms includes four evenly spaced apart coacting restraining arms. The plurality of adjustable restraining arms further includes a resilient end cap covering the free end of each vertical segment.

A locking mechanism releasably locks at least one adjustable restraining arm at a user-selectable position. Each horizontal segment of each restraining arm extends through an aperture in the housing. The locking mechanism includes a plurality of spaced apart protuberances (e.g., teeth) extending from a surface of at least one horizontal segment. The horizontal segment of each restraining arm is flexible in the vertical direction. The protuberances engage the peripheral edge of an aperture in the housing until the horizontal segment is deflected away from the engaged peripheral edge, thereby releasably locking the arm.

A cog contained within the housing is rotatable about a central axis of the cog. Each of the plurality of adjustable restraining arms includes a rack operably engaging the cog. In an alternative embodiment, the locking mechanism comprises an adjustable pin configured to releasably lock the cog and thereby prevent rotation of the cog to resist extension and retraction of each adjustable restraining arm.

Optionally, an elbow joins the rack of each adjustable restraining arm to the horizontal segment of each adjustable restraining arm. The elbow may substantially align the horizontal segment of each adjustable restraining arm with a centerline of the cog.

In operation, the cog rotates a first direction when an adjustable restraining arm is extended a first distance, and such rotation in the first direction causes each other coacting restraining arm to extend a distance corresponding to the first distance. Likewise, the cog rotates a second direction when an adjustable restraining arm is retracted a first distance, and such rotation in the second direction causing each other coacting restraining arm to retract a distance corresponding to the second distance.

The platform has a top surface and the apparatus further includes a removable pad attached to the top surface of the platform. The pad may be rigid or elastomeric and may provide a non-slip surface.

A method of cooking using a kitchen shaking apparatus is also described. The kitchen shaking apparatus includes a housing, a controllable oscillating actuator contained in the housing, a platform mechanically coupled to the controllable oscillating actuator, and a plurality of adjustable restraining arms operably coupled to the housing. Each of the adjustable restraining arms includes a vertical segment and a horizontal segment and is positioned and configured to allow the vertical segment to contact an object on the platform. A locking mechanism releasably locks the adjustable restraining arms in a determined position. At least one control is provided for activating the controllable oscillating actuator at a user-selectable frequency and for a user-selectable duration. The method includes steps of placing a container with mixed contents on the platform, setting each adjustable restraining arm for the horizontal segment thereof to abut the container, using a control, setting the duration and frequency for shaking the container, activating the kitchen shaking apparatus at the set frequency and for the set duration, releasing the adjustable restraining arms, removing the container, and chilling, cooking or otherwise processing the contents of the container.

BRIEF DESCRIPTION OF THE DRAWINGS

The foregoing and other aspects, objects, features and advantages of the invention will become better understood with reference to the following description, appended claims, and accompanying drawings, where:

Those skilled in the art will appreciate that the figures are not intended to be drawn to any particular scale; nor are the figures intended to illustrate every embodiment of the invention. The invention is not limited to the exemplary embodiments depicted in the figures or the specific types of components, configurations, shapes, relative sizes, ornamental aspects or proportions shown in the figures.

DETAILED DESCRIPTION

Figure 1:
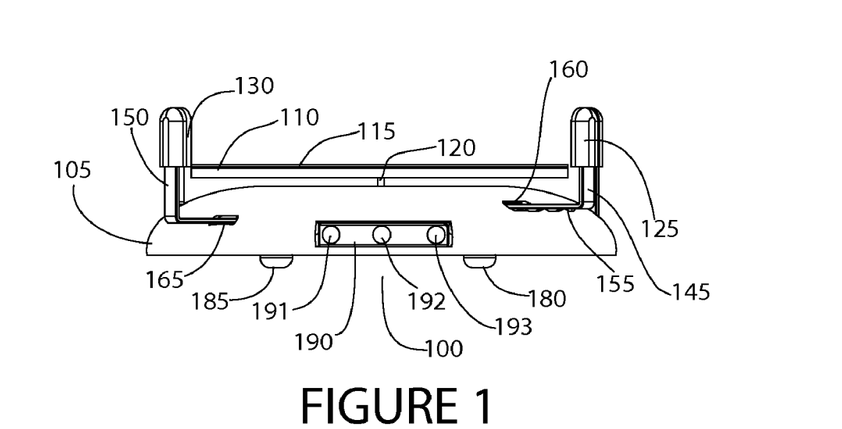
FIG. 1 is a front view of an exemplary batter shaking apparatus according to principles of the invention.
Figure 2:
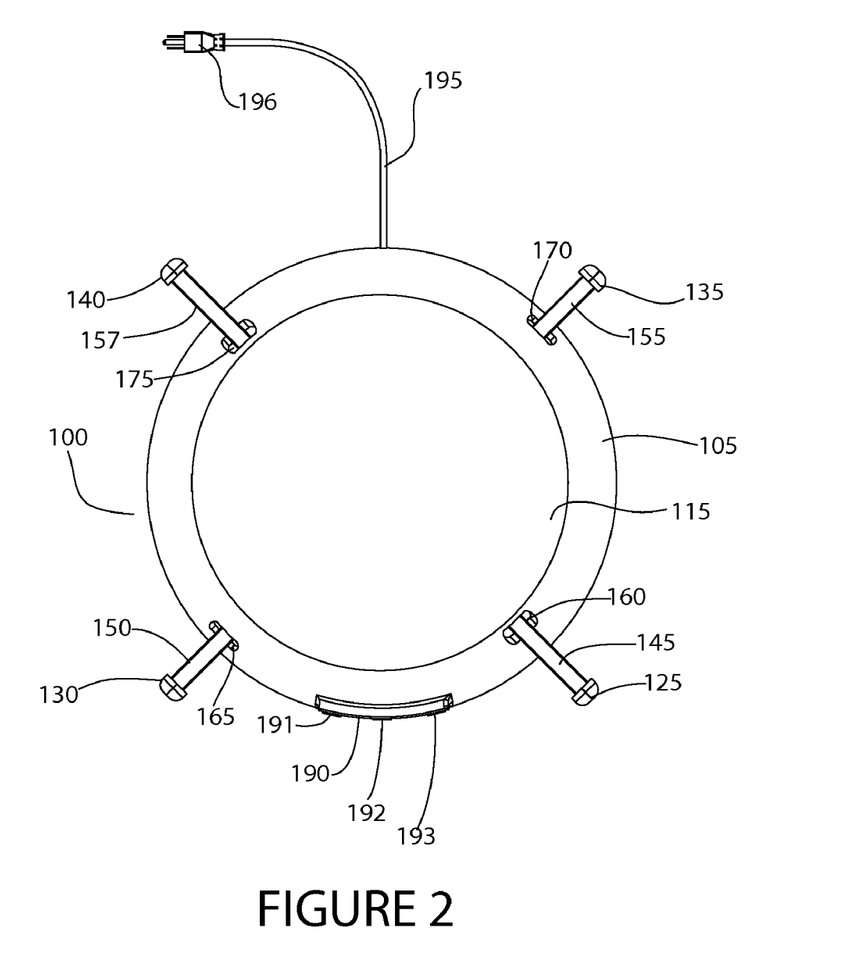
FIG. 2 is a plan view of an exemplary batter shaking apparatus according to principles of the invention.
Figure 5:
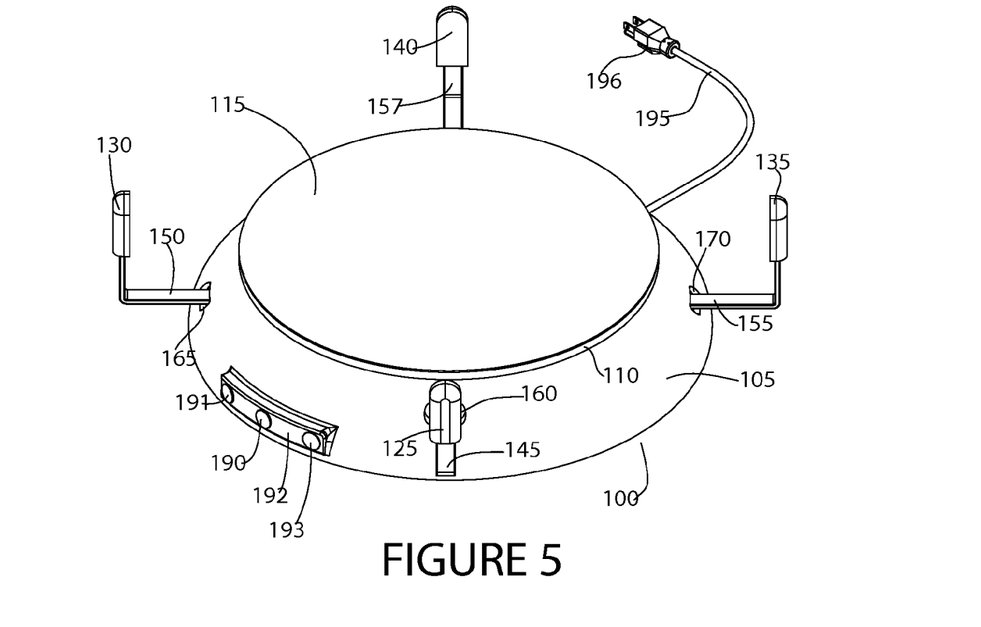
FIG. 5 is a perspective view of an exemplary batter shaking apparatus according to principles of the invention.

With reference to FIGS. 1, 2 and 5, various views of an exemplary batter shaking apparatus 100 according to principles of the invention are shown. Batter is used herein to refer broadly to any food ingredients that are mixed prior to other processing such as cooking, e.g., baking, or chilling or rising. In particular, batter refers to ingredients that may entrap gasses such as air when mixed together. The apparatus 100 comprises a housing 105 that contains controller and motor components. The housing 105 provides a mounting surface for attaching components and accessories such as switches. The housing 105 also provides an insulated enclosure for containing components to prevent electrical shock to users and protect the components from the environment.

The apparatus is referred to as a kitchen shaking apparatus because it is a shaking apparatus that is specially configured to vibrate food products. It may be used in commercial and/or home kitchens.

The apparatus 100 includes a vibrating platform 110. The platform 110 is a rigid planar support surface. In a preferred embodiment, the platform is comprised of a washable, durable plastic. However, the platform 110 may be comprised of other rigid materials, such as metals (e.g., stainless steel), in lieu of plastic. While a circular plan shape is shown, the shape is not limited to circular. Non-circular shapes may be utilized. The platform 110 is sized to support a kitchen bowl, tray or pan. In a preferred embodiment the diameter may vary from about 3 inches to about 12 inches; although, other sizes may be used.

Figures 3, 4:
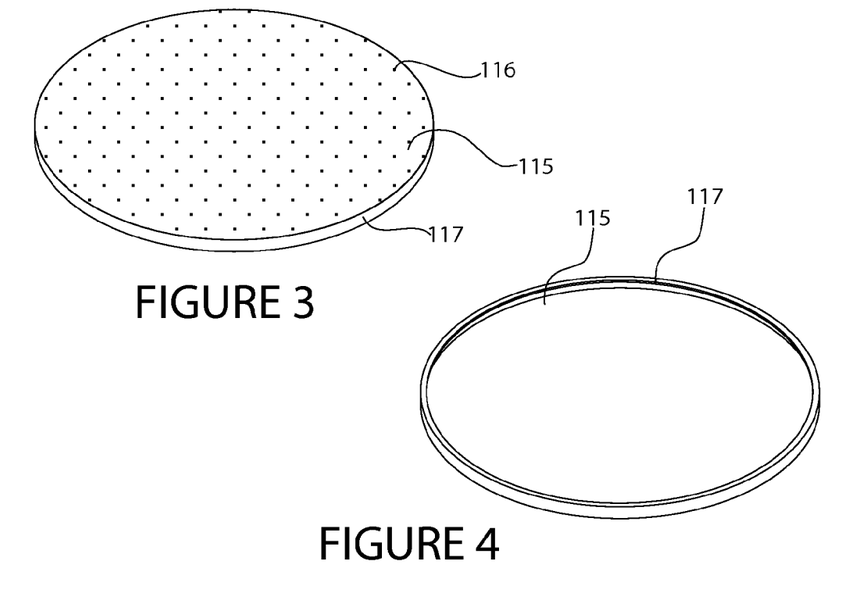
FIG. 3 is a first perspective view of an exemplary cover for a tray of an exemplary batter shaking apparatus according to principles of the invention.
FIG. 4 is a first perspective view of an exemplary cover for a tray of an exemplary batter shaking apparatus according to principles of the invention.

A removable pad 115 covers the top surface of the platform 110. The pad 115, as shown in FIGS. 3 and 4, may be machine washable. In a preferred embodiment, the pad 115 is a resilient elastomeric (e.g., silicone) cover fitted over the platform 110. However, a rigid or semi-rigid removable cover may be used in lieu of a resilient elastomeric cover. Mechanical and/or magnetic fasteners may be provided to removably attach the rigid or semi-rigid removable cover 115 to the platform 110. With reference to FIGS. 3 and 4, the pad 115 may include a textured gripping surface 116 and a peripheral edge 117 for engaging the platform 110. The textured surface 116 may include protuberances to prevent slipping. Alternatively, a non-textured surface and/or a material with a high coefficient of friction may be utilized.

As another alternative, a pad with female recesses and or male protruding features may engage with corresponding male or female features on the bottom of a container designed for use with the pad. Thus, the container may interlockingly engage the pad 115.

The platform 110 is oscillated by forces imparted via a drive shaft 120. The drive shaft 120 may move up and down, side to side, in one, two or three dimensions. The drive shaft 120 is driven by a linkage. The linkage is coupled to an actuator (e.g., a motor) within the housing 105. The invention is not limited to any particular drive shaft 120 and linkage. Any drive shaft 120 and linkage suitable for use in vibratory shakers may be utilized in connection with the apparatus 100. As an alternative to the drive shaft 120, any mechanism capable of transmitting oscillating forces from an actuator to the platform 110 may be utilized.

A control pad 190 may be mounted to or formed in the housing 105. The control pad 190 includes controls for activating and regulating the apparatus 100. Optionally, a display for monitoring the status is also provided. In an exemplary embodiment, the control pad 190 provides at least three controls 191, 192, 193. One control 191 activates the unit. One control 192 sets operating frequency (i.e., speed, namely, the number of cycles of oscillation completed per second). Another control 193 10 sets duration (i.e., how long the apparatus will run). The controls 191-193 provide logic level signals to control circuitry within the housing 105.

The apparatus 100 includes a power supply. In a preferred embodiment, an AC power cord 195 and plug 196 provide AC electrical power to a circuit that transforms the power into regulated DC power. The circuit may include an AC adapter or other power supply circuit elements configured to supply the desired current and voltage to components of the device. In an alternative embodiment, the apparatus 100 may include components configured to operate on AC power.

The apparatus includes a plurality of adjustable arms 145, 150, 155 and 157. Each arm includes an L-shaped segment with an elastomeric end cap 125, 130, 135, 140. The arms 145, 150, 155 and 157 may be extended from or retracted into the housing 105. The arms may be extended and retracted by sliding or threading action. The arms 145, 150, 155 and 157 extend through slots 160, 165, 170, 175 in the sides of the housing 105. Preferably there are four arms equally spaced apart (e.g., 4 arms spaced 90° apart). However, the invention is not limited to four arms or even spacing. In a preferred embodiment, the arms 145, 150, 155 and 157 are coacting, i.e., extending one arm (i.e., withdrawing the arm from the housing 105) a certain distance causes some or all of the other arms to extend by the same distance. Conversely, retracting one arm (i.e., sliding the arm into the housing 105) a certain distance causes some or all of the other arms to retract by the same distance. In an alternative embodiment, each arm may extend and retract independent of the other arms. The arms may be threadedly or slidingly engaged by the housing.

Figures 6, 7A:
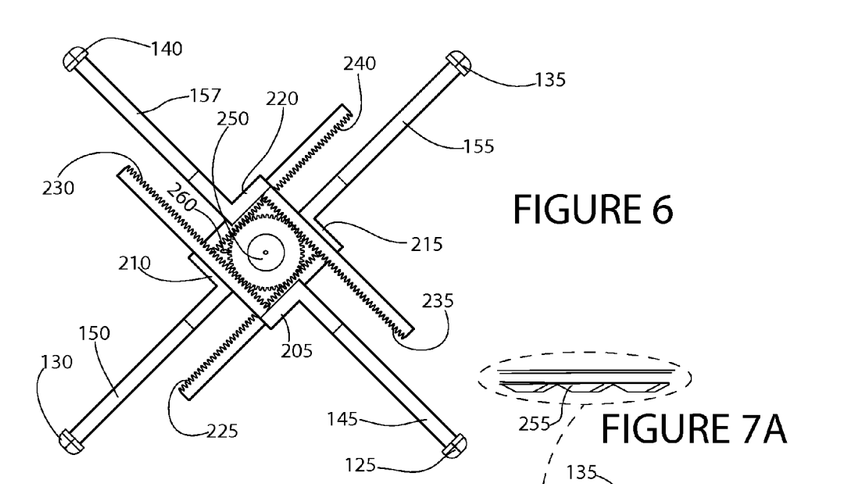
FIG. 6 is a plan view of an exemplary coacting restraining arm assembly for a batter shaking apparatus according to principles of the invention.
FIG. 7A is a magnified view of a segment of an exemplary coacting restraining arm assembly for a batter shaking apparatus according to principles of the invention.
Figure 7:
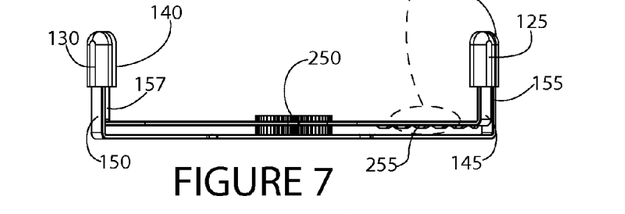
FIG. 7 is a side view of an exemplary coacting restraining arm assembly for a batter shaking apparatus according to principles of the invention.
Figure 8:
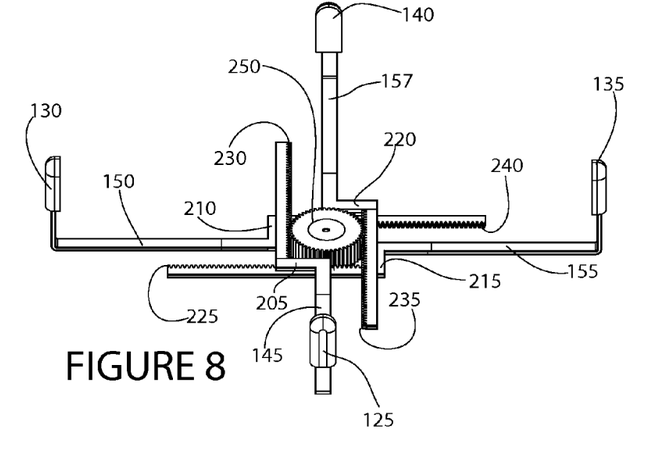
FIG. 8 is a top perspective view of an exemplary coacting restraining arm assembly for a batter shaking apparatus according to principles of the invention.

Referring now to FIGS. 6 through 8, an exemplary coacting adjustable arm assembly is shown. Each adjustable arm includes a gear rack 225, 230, 235, 240, which engages a cog 250. Extending an arm causes the cog 250 to rotate in one direction (e.g. counterclockwise). Such rotation causes each other coacting arm to extend the same distance. Retracting an arm causes the cog 250 to rotate in the opposite direction (e.g., counterclockwise). Such rotation causes each other coacting arm to retract the same distance. To keep opposite arms 145, 150, 155 and 157 substantially aligned (i.e., with arm 130 substantially aligned with arm 155 and arm 145 substantially aligned with arm 157), each arm includes an elbow 205, 210, 215, 220. The elbow 205, 210, 215, 220 is an L-shaped section that joins the gear rack 225, 230, 235, 240 to the arm 145, 150, 155 and 157. The elbow is configured to allow the gear rack 225, 230, 235, 240 to engage the cog 250 while the arm 145, 150, 155 and 157 is aligned (or nearly aligned) with the centerline of the cog 250. Thus, each elbow includes a segment that extends from the gear rack 225, 230, 235, 240 engaging the cog 250 to approximately the centerline of the cog 250.

While one cog 250 is shown, skilled artisans will appreciate that more than one cog 250 may be used. Thus, embodiments with more than one cog are intended to come within the spirit and scope of the invention.

While substantially aligned arms 145, 150, 155 and 157 are shown, those skilled in the art will appreciate that the invention is not limited to aligned arms. Illustratively, each arm may omit an elbow and be straight. Additionally, three arms may be used and spaced apart by 120°.

The free end of each arm is bent to extend upwardly (i.e., vertically) at least in part. Optionally, the vertically extending segment may be connected to the horizontally extending segment by a hinge. In such an embodiment, the upwardly extending segment may be folded down for storage or to avoid contact with an object placed upon the platform 110 and pad 115. So long as the arm includes an upwardly extending component that is suitable for gripping, the particular transition (e.g., a curve or a sharp right angle, fixed or hinged) from the horizontal portion is also not important. The upwardly extending portion may extend perpendicular to the horizontal portion. Alternatively, the upwardly extending portion may extend upwardly at an angle between the vertical and horizontal.

An elastomeric end cap 125, 130, 135, 140 covers a portion of the free end. The end cap 125, 130, 135, 140 performs several functions, including cushioning, gripping and dampening. The end cap 125, 130, 135, 140 is comprised of a resilient elastomeric material (e.g., rubber or silicone), which, when brought into contact with an object placed on the platform 110 and pad 115, cushions and grips the object. The end cap 125, 130, 135, 140 may deform to conform to the shape of the object. The end cap 125, 130, 135, 140 may be textured or include a surface with a high coefficient of friction to resist slipping. While gripping an oscillating object, the end cap 125, 130, 135, 140 dampens vibrations transmitted to the object and retains the object in position on the platform 110 and pad 115. The dampening is achieved because the end cap is connected to an arm which, in a preferred embodiment, is connected to the base (i.e., the housing 105), not to the vibrating platform 110. However, alternative embodiments with arms extendable and retractable from the platform 110, though not preferred, also come within the scope of the invention.

One or more of the arms 145, 150, 155 and 157 includes a locking mechanism, i.e., a feature to releasably lock the arm 145, 150, 155 and 157 at a desired position. In embodiments with locking arms, preferably only one coacting arm is locked to facilitate setting and releasing. By way of example and not limitation, the bottom side of the horizontal segment of an arm may include a plurality of spaced apart protuberances 255 (e.g., teethed notches), resembling a gear rack. A corresponding edge of a slot 160 is engaged between protuberances 255 when the horizontal segment of the arm is released. The arm may be extended and retracted by lifting the horizontal segment upward slightly. The arm may be spring biased or resilient to allow upward deflection. The arm is highly flexible in the vertical plane. Upward lifting deflects the arm enough to allow the protuberances 255 to freely travel past the edge (i.e., lip) of the slot 160. When the horizontal segment is released, the edge of the slot 160 is engaged between protuberances 255. The number, size and spacing of the protuberances may be adapted to provide a desired range of locking positions. Additionally, the protuberances may be disposed on the top, bottom or sides of an arm. In such embodiments, unlocking may be accomplished by urging the arm downward or towards one side or the other.

Locking mechanisms other than the teethed notch locking mechanism described above may be utilized and come within the scope of the invention. Features and assemblies that clamp an arm or an appendage to an arm may be utilized. Teethed notches may be applied along the top or side surfaces of the arm assemblies. Features and assemblies that directly or indirectly interlock the arm to the housing may also be utilized. Features or assemblies that releasably lock the cog 250 may also be utilized. By way of illustration, a user actuated pin 260 configured to selectively engage the cog and prevent rotation thereof may be used as a locking mechanism. In such an embodiment, the pin may be moved into interlocking engagement with the cog by rotational or translation movement. An external button, knob, switch or lever may be provided for user actuation. In such an embodiment, the cog will resist rotation until the pin is released. A control on the exterior of the housing may be provided to selectively set and release the pin.

In a particular embodiment, dampening effect caused by the arms 145, 150, 155 and 157 is limited. The arms may be locked just beyond the periphery of the container, so that there is limited dampening of the vibration. Illustratively, a small (e.g., ¼ inch) gap between the container periphery and the end caps may be maintained, allowing the vibrating container to 'skid' around between the arms. Additionally, an amount of 'give' in the grip-tension of the arms may be provided. The end caps 125, 130, 135, 140 may, for example, be soft and resilient. The end caps may be replaceable for desired resiliency and dampening effect. Thus, if brought gently into contact with the container, only slight dampening, if any, will be achieved. The arms 145, 150, 155 and 157 may also exhibit flexibility and/or resiliency. Furthermore, the arms may include a spring biased component. By way of example and not limitation, the upwardly extending segments of the arms may be spring-loaded, such that the dampening effect of the end caps is mitigated. In each of these embodiments, little or no dampening is achieved.

An advantage of the invention is an ability to regulate dampening. In embodiments where the arms are associated with the housing, the arms may be used to retain a container and regulate (e.g., omit, limit or maximize) dampening of the container. In embodiments with arms associated with the platform, such regulation of dampening is not provided by the arms.

In an embodiment where the arms are coacting (i.e., where the arms act in unison), locking one arm (or the gear) will prevent movement of all other coacting arms. Thus, one locking mechanism may be provided for each set of coacting arms. However, where arms move independently, a locking mechanism may be associated with each independently moving arm.

Figure 9:
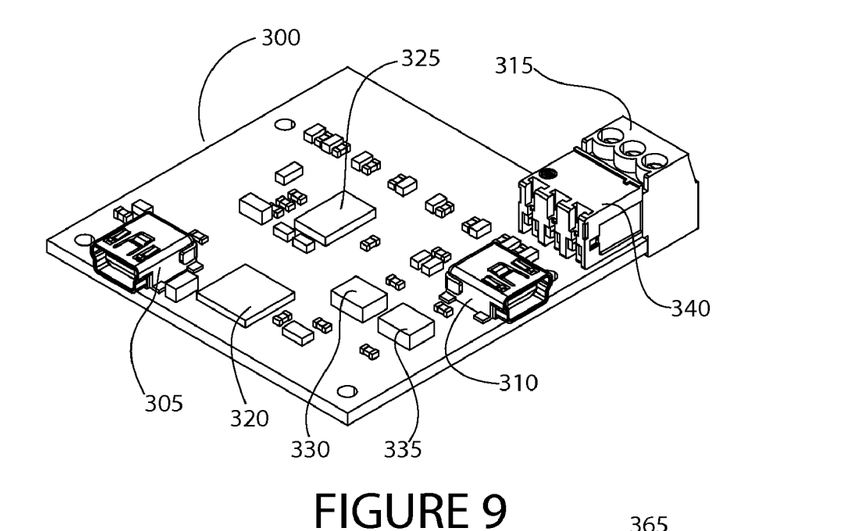
FIG. 9 is a perspective view of an exemplary control circuit board assembly for a batter shaking apparatus according to principles of the invention.

Referring now to FIG. 9, an exemplary control module 300 is conceptually shown. The control module is contained in the housing 105 and operably coupled to the actuator, control pad 192 and power supply 195, 196 via a control interface 305, actuator interface 310 and power jack 315. A microcontroller 320 receives control pad inputs via its port 305. An operator, by setting controls 190, 191, 193 on the control pad 192 thereby inputs commands and information for the different functions of the system.

The microcontroller 320 through an interface port 310 communicates with the actuator via a driver circuit (e.g., a motor control circuit 325), which may be an integral part of the microcontroller or a separate circuit. A function of the microcontroller 320 is to provide a closed loop control for the oscillating speed of the platform 110. It may accomplish this function by providing a logic level motor control signal. In one nonlimiting exemplary embodiment, a motor control signal is transmitted through a filter, comprising a resistor and a capacitor, to the base of a drive transistor having its collector tied to one terminal of the motor coil and its emitter terminal connected to ground. The other terminal of the motor coil is connected to a source of drive voltage. A diode is paralleled with the motor 345 (i.e., the motor coil) such that when the transistor switches on and off the inductive kick pulse will be dissipated in the diode. In this embodiment, the microcontroller produces a square wave output which is amplified by a power transistor 330 to switch the motor coil either fully on or fully off. This causes the motor to accelerate at a maximum rate provided by the voltage when the transistor 330 is on and to freewheel and decelerate when the transistor is off. The filter rounds the edges of the square wave to provide a smooth transition between the switching levels. The control signal is switched on in response to a state of the motor being below the desired velocity and is switched off in response to the motor being in excess of the desired velocity. The actual velocity of the motor may be determined by the microcontroller through an input signal received via the motor interface port 310. The signal is generated by a sensor such as an optoelectric sensor associated with the motor. Other forms of motor speed control known in the art may be utilized in accordance with the invention.

The microcontroller 320 also controls duration of oscillation via an integrated or separate timing circuit 325. The timing circuit responds to user input from a timing control 193. At the end of a timed duration, electric power to the motor is interrupted and the motor free wheels to a standstill.

The control module also includes power conversion and regulation components. In an embodiment where a DC output is required, AC input from the plug 196 is transformed and rectified using a transformer and rectifier circuit 340. The rectified output is then smoothed by a filter 335. The output is at the voltage and current required by the motor. The invention is not limited to any particular power supply, power conditioning circuit or motor requirements.

Figure 10:
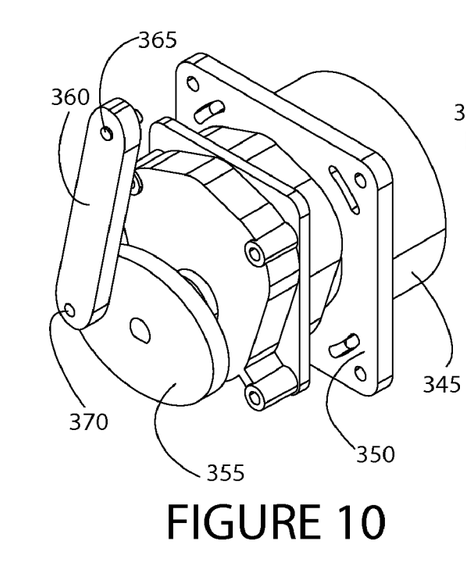
FIG. 10 is a first perspective view of an exemplary actuator for a batter shaking apparatus according to principles of the invention.
Figure 11:
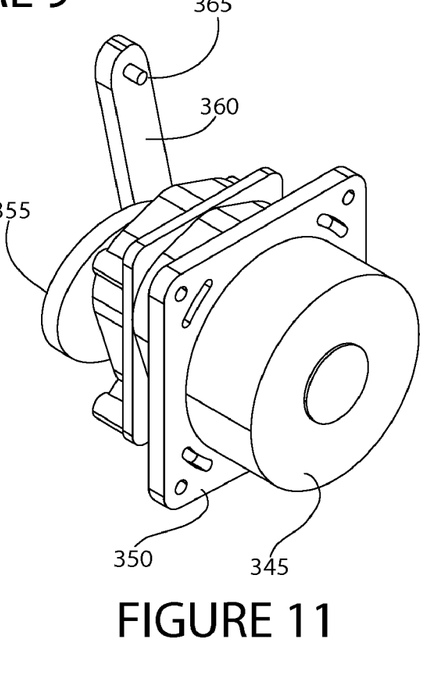
FIG. 11 is a second perspective view of an exemplary actuator for a batter shaking apparatus according to principles of the invention.

The actuator supplies oscillating forces to the drive shaft 120. In an exemplary embodiment, a motor 345 having an eccentrically mounted linkage 360 connected directly or indirectly to the drive shaft 120 provides the oscillating forces, as illustrated in FIGS. 10 and 11. The motor may be a geared DC servo motor. As the motor 345 shaft rotates, a circular or non circular disk 355, a linkage 360 pivotally connected by a connecting pin 370 moves in oscillating fashion. The linkage is connected directly or indirectly to the shaft 120 by a connecting pin 365. A mounting pad 350 is provided to secure the motor within the housing 105.

While a particular motor configuration and linkage are illustrated for exemplary purposes, the invention is not limited thereto. Rather, other actuators capable of controllably imparting oscillating forces to the drive shaft 120 may be used in lieu of the motor described above. Additionally, the linkage may vary considerably from the mechanism conceptually described above. In each case, however, the invention requires an actuator, the speed and duration of which may be controlled. Such an actuator is referred to herein as a controllable actuator. Additionally, in each case, the invention requires a linkage that mechanically transmits oscillating forces from the actuator to the drive shaft 120. Such a linkage is referred to herein as a mechanical linkage.

Figure 12:
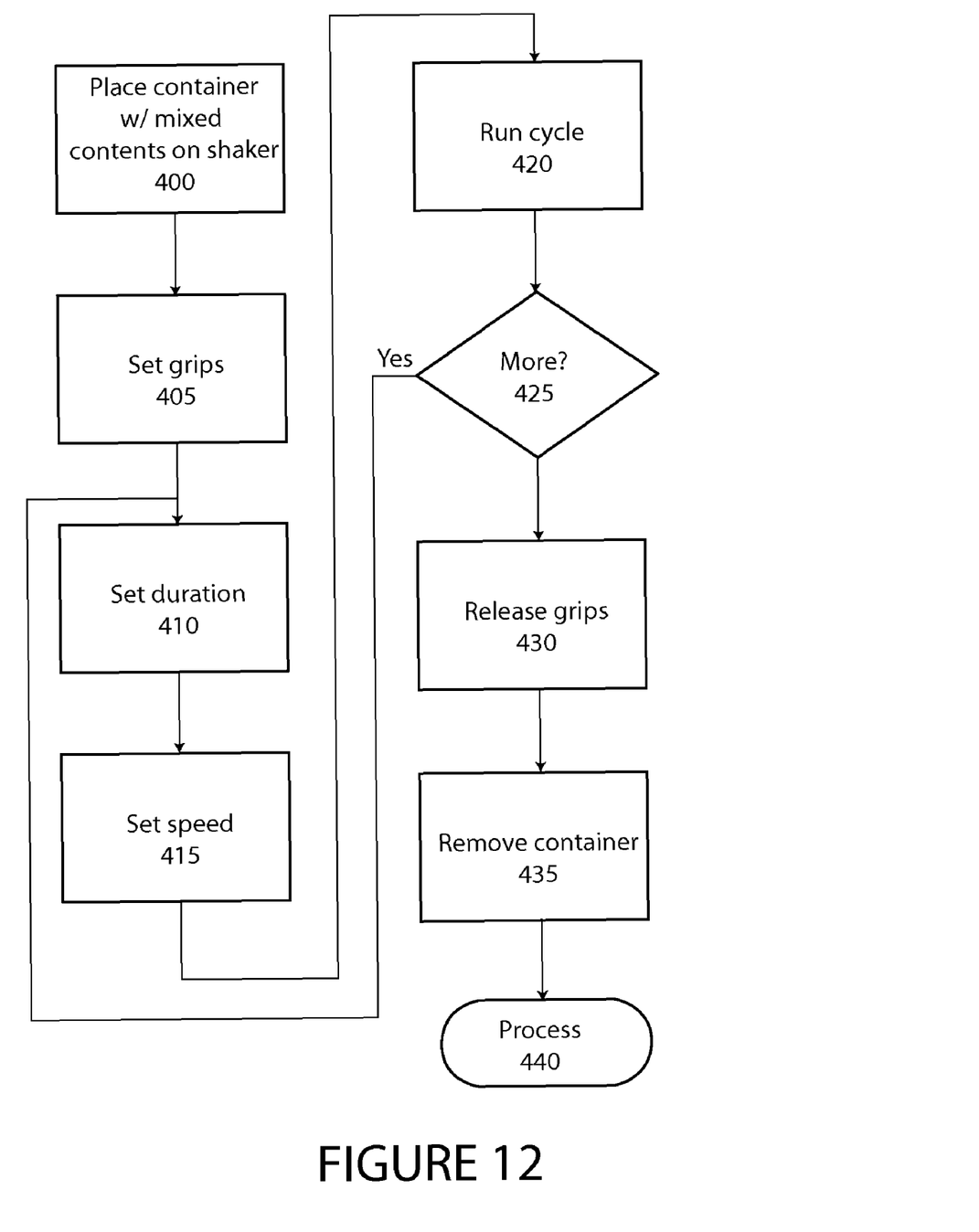
FIG. 12 is a flowchart for an exemplary method of using a batter shaking apparatus according to principles of the invention.

Referring now to FIG. 12, a flowchart for a method of use is provided. The method entails placing a container with mixed contents on the pad 115 of the platform 110, as in step 400. The container may be a bowl and the contents may be a batter. Gasses (e.g., air) are entrapped in the batter upon mixing. In step 405, the grips are set. This entails adjusting the arms 145, 150, 155 and 157 until their end caps 125, 130, 135, 140 firmly contact the container. The arms 145, 150, 155 and 157 with their end caps 125, 130, 135, 140 are referred to herein as adjustable grips or restraining arms. The arms 145, 150, 155 and 157 are locked into place. Next, in steps 410 and 415, the duration and speed are set using the available control pad and corresponding controls 190-193. Then the cycle is run, as in step 420. The container will be vibrated at the selected speed (i.e., frequency) for the selected duration. Then a decision is made if more vibration is needed, as in step 425. When the initial cycle has completed, if substantial bubbles are observed rising through the batter, the user may decide to start another cycle to release more entrapped gases. These steps may be repeated until a desired consistency is attained. When mixing has been completed, the grips are unlocked and extended to release the grip, as in step 430. The container may then be removed, as in step 435, and processing (e.g., rising, baking, chilling, decorating, or other food preparation step(s)) may proceed as in step 440. The product will exhibit less voids and air pockets. The consistency of the product will be more uniform.

Figure 13:
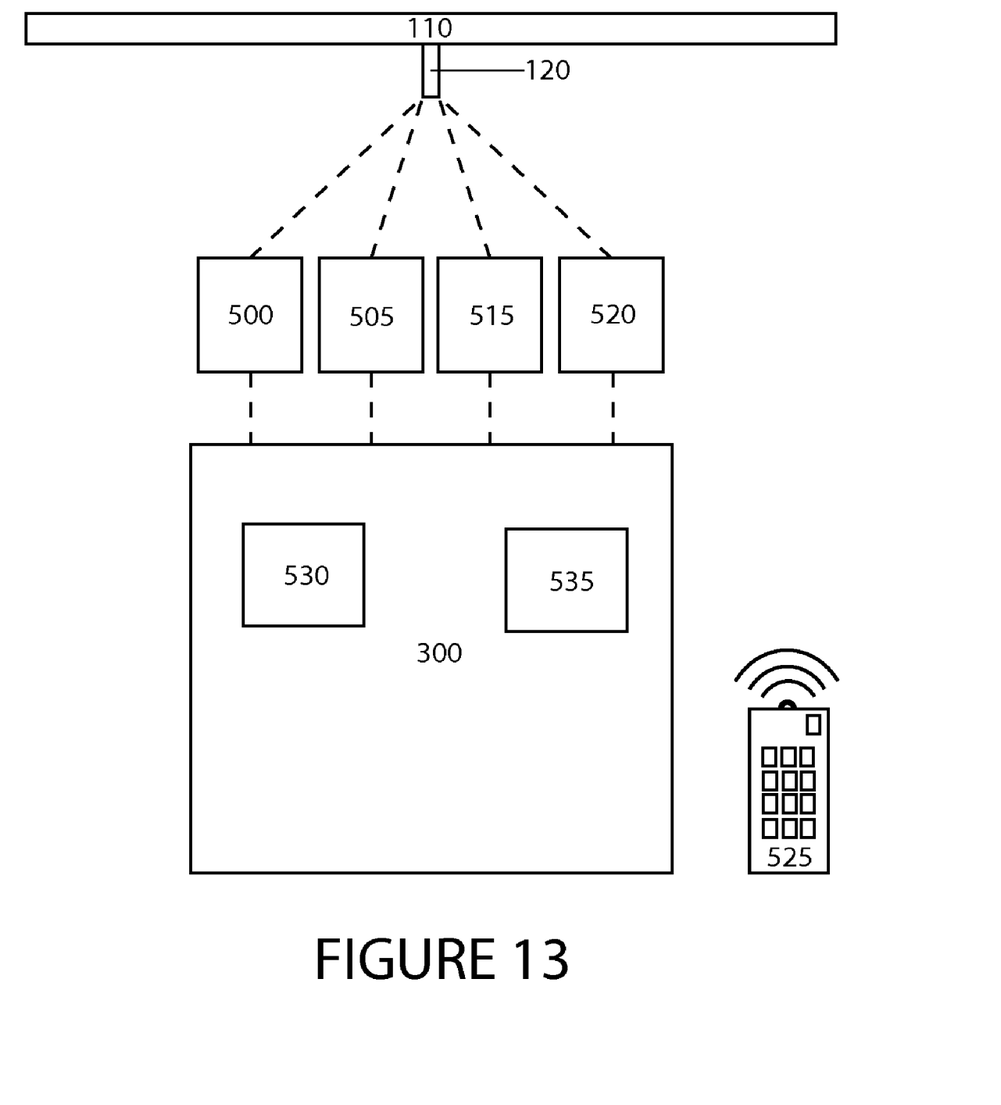
FIG. 13 is a high level block diagram conceptually illustrating components of an exemplary batter shaking apparatus according to principles of the invention.

FIG. 13 is a high level block diagram conceptually illustrating optional components of a particular embodiment of an exemplary batter shaking apparatus according to principles of the invention. In this embodiment, one or more sensors 500-520 are directly or indirectly associated with the platform 110, and/or the pad 115, and/or the drive shaft 120. The sensor 500-520 produces a signal (e.g., an analog signal) in response to a change in condition. The sensor 500-520 may be optical, acoustic, electrical or electro-mechanical. By way of example, an optical sensor 500 may detect the presence of a container. A strain gauge 505 may detect the presence and weight of a container. An electromechanical switch 515 may detect the presence of a container. An electromagnetic sensor 520 may detect the presence of a container. One or more of these sensors may be used. The sensor may provide a signal, such as an analog signal, to the control module 300. The control module may be equipped with an analog to digital converter 530. The analog-to-digital converter 530 converts the analog voltage (or current) from the sensor 500-520 to a digital signal based upon the magnitude of the voltage or current. When a sensor 500-520 detects the presence of a container, the control module 300 may power-on the apparatus 100 and/or commence actuation.

In one embodiment, a weight sensor (e.g., strain gauge) 505 may allow measuring the weight. Thus, the apparatus 100 may also serve as a scale. The control module 300 and user selectable controls on the panel 190, optionally may include a tare control to zero out the empty container and then measure the weight of the contents. In such an embodiment, the determined weight may be used to determine the duration and frequency of shaking Optionally, a remote control 525 may be provided to activate and control the apparatus 100. In such an embodiment, the control module 300 may be equipped with a compatible wireless control module 535. Wireless communication may be optical or radio frequency.

Figure 14:
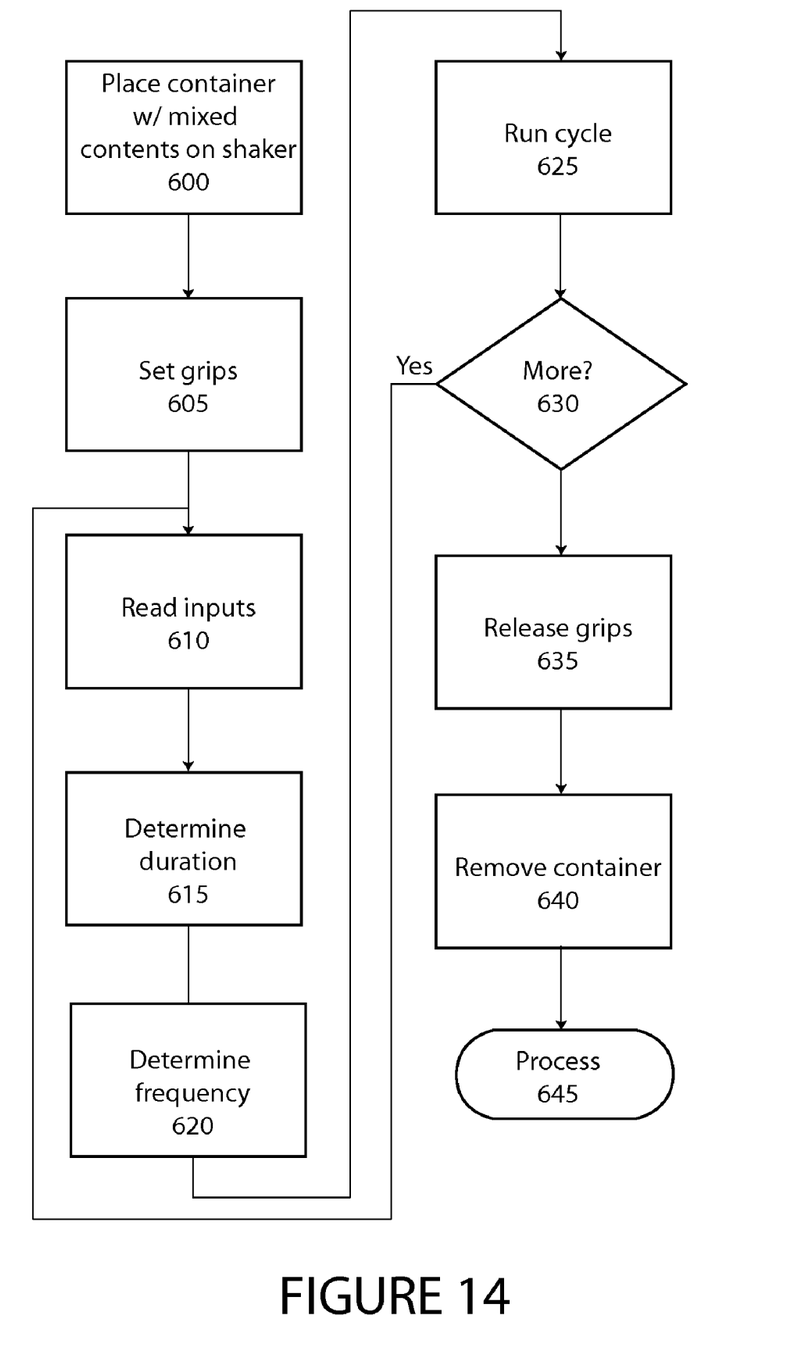
FIG. 14 is a flowchart for an exemplary method of using a batter shaking apparatus according to principles of the invention.

Referring now to FIG. 14, another flowchart for an exemplary method of using a batter shaking apparatus 100 according to principles of the invention. The flowchart in FIG. 14 differs from the flowchart in FIG. 12 because the inputs are read and duration and frequency are determined in steps 610 to 620. The method entails placing a container with mixed contents on the pad 115 of the platform 110, as in step 600. The container may be a bowl and the contents may be a batter. Gasses (e.g., air) are entrapped in the batter upon mixing. In step 605, the grips are set. This entails adjusting the arms 145, 150, 155 and 157 until their end caps 125, 130, 135, 140 firmly contact the container. The arms 145, 150, 155 and 157 with their end caps 125, 130, 135, 140 are referred to herein as adjustable grips or restraining arms. The arms 145, 150, 155 and 157 are locked into place. Next, in steps 610, inputs are read. The inputs may be user generated or sensor signals. Based upon the inputs, duration and frequency are determined, as in steps 615 and 620. Then the cycle is run, as in step 625. The container will be vibrated at the selected speed (i.e., frequency) for the selected duration. Then a decision is made if more vibration is needed, as in step 630. When the initial cycle has completed, if substantial bubbles are observed rising through the batter, the user may decide to start another cycle to release more entrapped gases. These steps may be repeated until a desired consistency is attained. When mixing has been completed, the grips are unlocked and extended to release the grip, as in step 635. The container may then be removed, as in step 640, and processing (e.g., rising, baking, chilling, decorating, or other food preparation step(s)) may proceed as in step 645. The product will exhibit less voids and air pockets. The consistency of the product will be more uniform.

Figure 15:
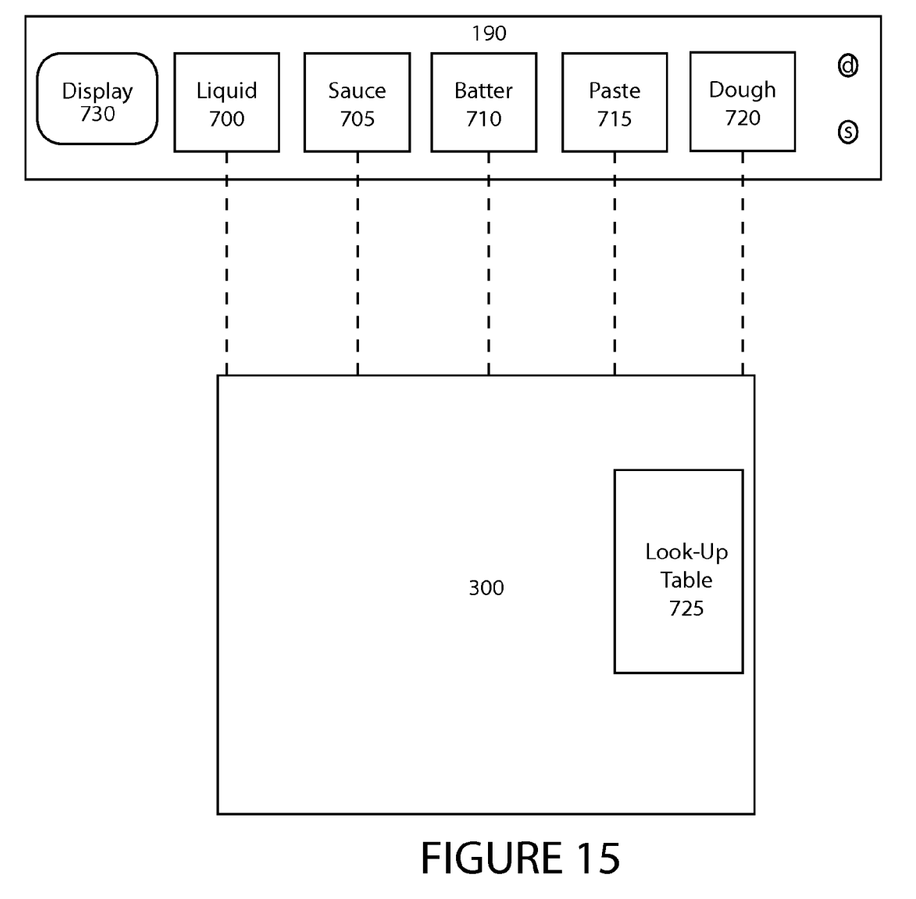
FIG. 15 is a high level block diagram conceptually illustrating components of an exemplary control subsystem for a batter shaking apparatus according to principles of the invention.

FIG. 15 is a high level block diagram conceptually illustrating components of an exemplary control subsystem for a batter shaking apparatus according to principles of the invention. Controls 700-720 initiate operation based upon the substance being shaken. In the exemplary embodiment shown in FIG. 15, the substances vary in viscosity from a thin liquid to a thick dough. The controls 700-720 represent various types of substances, such as liquid 700, sauce 705, batter 710, paste 715 and dough 720. The controls may be labeled with the names as shown, other names or characters, other indicia, or may be unlabeled. The controls may be preset and/or user settable. In a user settable embodiment, a user may set duration (d) and frequency (s) for speed, using the controls to the right of the dough control 720. A display 730, such as an LCD, may be provided to create and determine settings. Set durations and frequencies may be stored in nonvolatile memory in the control module 300, such as in a look-up table 725. During operation, the values stored for the selected control are used to govern operation.

The controls shown on the control pad are shown for illustrative purposes only and do not limit the invention. Other types of user selectable elements may be used in lieu of and/or in addition to any or all of the controls shown in the Figures without departing from the spirit and scope of the invention.

Figure 16:
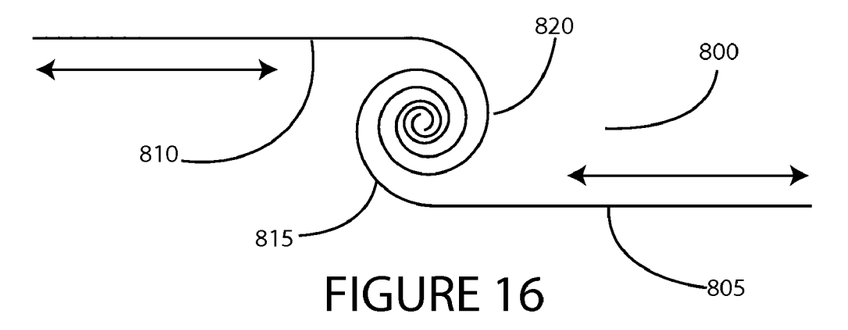
FIG. 16 is a plan view of an exemplary coacting restraining arm assembly for a batter shaking apparatus according to principles of the invention.
Figure 17:
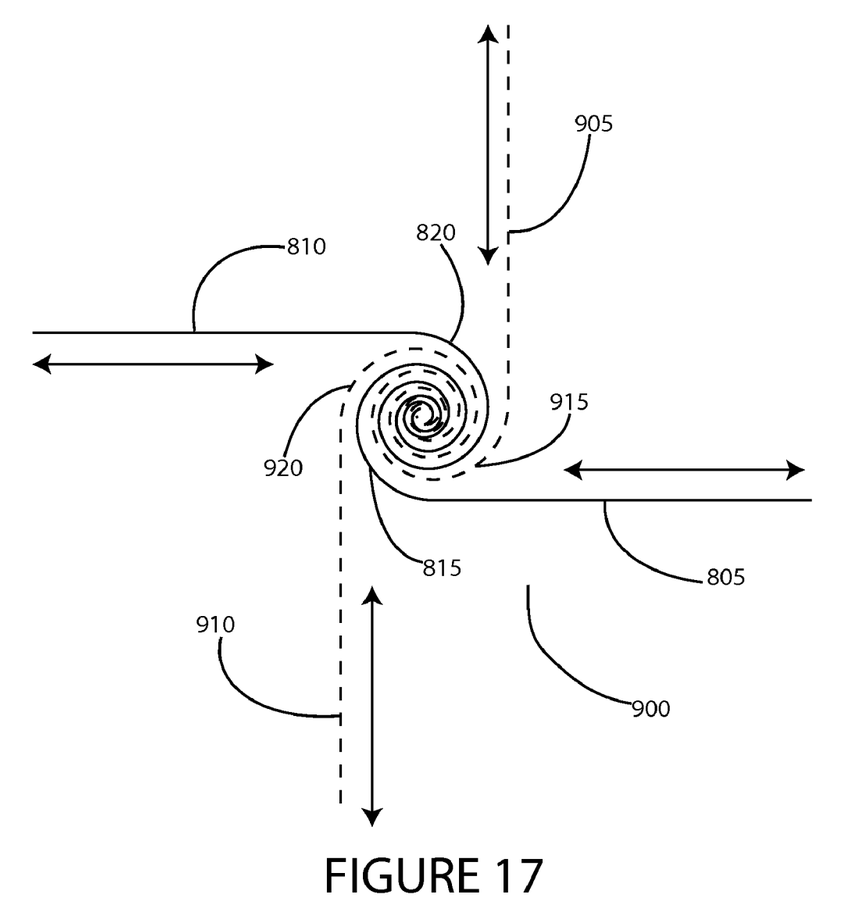
FIG. 17 is a plan view of another exemplary coacting restraining arm assembly for a batter shaking apparatus according to principles of the invention.

Referring now to FIGS. 16 and 17, plan views of exemplary coacting restraining arm assemblies for a batter shaking apparatus according to principles of the invention are shown. These alternative assemblies comprise flat spiral springs comprising strips of material wound into a flat spiral. Each coacting set 800, 900, includes a pair of engaging spiral springs. Each flat spiral spring includes an arm, 805, 810, 905, 910, and a coiled portion 815,820, 915,920. The coiled portions resist extension. Extending one arm causes the other arm in the coacting set of arms to extend a similar amount. At least one arm in a coacting set may include a locking mechanism, such as the toothed notch locking mechanism described above. The arms include L-shaped free ends (or similarly shaped with at least some upwardly extending component) to facilitate gripping, as described above. In use, the arms would be locked into an extended position. After a container is placed on the platform 110 and/or pad 115, the arms are unlocked, allowing gripping the naturally retracting arms of the flat spiral spring to be drawn against the container. If an assembly of more than one coacting sets is used, such as assembly 900 as in FIG. 17, the coacting sets of flat spiral springs may be stacked in different planes.

In a particular embodiment, the dampening effect caused by the arms may be limited. The arms may be locked just beyond the periphery of the container, so that there is limited dampening of the vibration. Illustratively, a small (e.g., ¼ inch) gap between the container periphery and the end caps may be maintained, allowing the vibrating container to 'skid' around between the arms. Additionally, an amount of 'give' in the grip-tension of the arms may be provided. End caps 125, 130, 135, 140 provided on the upwardly extending portion of the arms may, for example, be soft and resilient. Thus, if brought gently into contact with the container, only slight dampening, if any, will be achieved. The arms 805, 810, 905, 910 may also exhibit sufficient flexibility and/or resiliency to avoid substantial dampening. Furthermore, the arms may include a spring biased component. By way of example and not limitation, the upwardly extending segments of the arms may be spring-loaded, such that the dampening effect of the end caps is mitigated. In each of these embodiments, little or no dampening is achieved.

FIG. 17 is a plan view of another exemplary coacting restraining arm assembly for a batter shaking apparatus according to principles of the invention.

While an exemplary embodiment of the invention has been described, it should be apparent that modifications and variations thereto are possible, all of which fall within the true spirit and scope of the invention. With respect to the above description then, it is to be realized that the optimum relationships for the components and steps of the invention, including variations in order, form, content, function and manner of operation, are deemed readily apparent and obvious to one skilled in the art, and all equivalent relationships to those illustrated in the drawings and described in the specification are intended to be encompassed by the present invention. The above description and drawings are illustrative of modifications that can be made without departing from the present invention, the scope of which is to be limited only by the following claims. Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents are intended to fall within the scope of the invention as claimed.

What is claimed is:

1. A kitchen shaking apparatus comprising a housing, a controllable oscillating actuator contained in said housing, a platform mechanically coupled to said controllable oscillating actuator, a plurality of adjustable restraining arms operably coupled to said housing, each of said restraining arms including an upward segment and a horizontal segment and being positioned and configured to allow the upward segment to contact an object on the platform, said at least one control for activating said controllable oscillating actuator comprising a speed control configured to control frequency of oscillation of the actuator, and a timer control configured to control duration of operation of the actuator, wherein the upward segment of each adjustable restraining arm extends from the horizontal segment to an elevation above the platform, said plurality of adjustable restraining arms comprising four evenly spaced coacting restraining arms, and each upward segment having a free end, and said plurality of adjustable restraining arms further comprising a resilient end cap covering the free end of each upward segment.

2. A kitchen shaking apparatus according to claim 1, further comprising a locking mechanism adapted to releasably lock at least one adjustable restraining arm at a user-selectable position.

3. A kitchen shaking apparatus according to claim 2, each horizontal segment of each restraining arm extending through an aperture in the housing, and said locking mechanism comprising a plurality of spaced apart protuberances extending from a surface of at least one horizontal segment.

4. A kitchen shaking apparatus according to claim 3, said horizontal segment having the plurality of spaced apart protuberances extending from a surface thereof being flexible in the upward direction, and said aperture having a peripheral edge, and said protuberances engaging the peripheral edge until the horizontal segment is deflected away from the engaged peripheral edge.

5. A kitchen shaking apparatus comprising a housing, a controllable oscillating actuator contained in said housing, a platform mechanically coupled to said controllable oscillating actuator, a plurality of adjustable restraining arms operably coupled to said housing, each of said restraining arms including an upward segment and a horizontal segment and being positioned and configured to allow the upward segment to contact an object on the platform, said at least one control for activating said controllable oscillating actuator comprising a speed control configured to control frequency of oscillation of the actuator, and a timer control configured to control duration of operation of the actuator, wherein the upward segment of each adjustable restraining arm extends from the horizontal segment to an elevation above the platform, and said plurality of adjustable restraining arms comprising at least two coacting restraining arms, further comprising a cog contained within said housing and rotatable about a central axis of the cog, and each of said plurality of adjustable restraining arms including a rack operably engaging the cog.

6. A kitchen shaking apparatus according to claim 5, further comprising a locking mechanism adapted to releasably lock the cog and thereby prevent rotation of the cog to resist extension and retraction of each adjustable restraining arm.

7. A kitchen shaking apparatus according to claim 6, said elbow substantially aligning the horizontal segment of each adjustable restraining arm with a centerline of the cog.

8. A kitchen shaking apparatus according to claim 6, said cog rotating a first direction when an adjustable restraining arm is extended a first distance, and such rotation in the first direction causing each other restraining arm to extend a distance corresponding to the first distance, and said cog rotating a second direction when an adjustable restraining arm is retracted a first distance, and such rotation in the second direction causing each other restraining arm to retract a distance corresponding to the second distance.

9. A kitchen shaking apparatus according to claim 5, further comprising an elbow joining the rack of each adjustable restraining arm to the horizontal segment of each adjustable restraining arm.

10. A kitchen shaking apparatus comprising a housing, a controllable oscillating actuator contained in said housing, a platform mechanically coupled to said controllable oscillating actuator, a plurality of adjustable restraining arms operably coupled to said housing, each of said restraining arms including an upward segment and a horizontal segment and being positioned and configured to allow the upward segment to contact an object on the platform, each of said restraining arms comprising a flat spiral spring assembly.

11. A kitchen shaking apparatus comprising a housing, a controllable oscillating actuator contained in said housing, a platform mechanically coupled to said controllable oscillating actuator, a plurality of adjustable restraining arms operably coupled to said housing, each of said restraining arms including an upward segment and a horizontal segment and being positioned and configured to allow the upward segment to contact an object on the platform, further comprising one or more sensors adapted to sense a condition and generate a signal, and a control module configured to regulate duration and frequency based upon at least one of input from the sensor and input from a user.

12. A method of cooking using a kitchen shaking apparatus, said kitchen shaking apparatus comprising a housing, a controllable oscillating actuator contained in said housing, a platform mechanically coupled to said controllable oscillating actuator, a plurality of adjustable restraining arms operably coupled to said housing, each of said adjustable restraining arms including an upward segment and a horizontal segment and being positioned and configured to allow the upward segment to contact an object on the platform, and a locking mechanism configured to releasably lock the adjustable restraining arms in a determined position, and at least one control for activating said controllable oscillating actuator at a user-selectable frequency and for a user-selectable duration, and said method comprising steps of     placing a container with mixed contents on the platform,     setting each adjustable restraining arm for the horizontal segment thereof to abut the container,     using the at least one control, setting the duration and frequency for shaking the container,     activating the kitchen shaking apparatus at the set frequency and for the set duration,     releasing the adjustable restraining arms,     removing the container, and     cooking the contents of the container.

\* \* \* \* \*